United States Patent
Hashimoto

[11] Patent Number: 4,759,052
[45] Date of Patent: Jul. 19, 1988

[54] TELEPHONE ANSWERING DEVICE USING VOICE SYNTHESIZER FOR OUTGOING MESSAGE

[75] Inventor: Kazuo Hashimoto, Tokyo, Japan

[73] Assignee: Hashimoto Corporation, Tokyo, Japan

[21] Appl. No.: 69,533

[22] Filed: Jul. 1, 1987

[30] Foreign Application Priority Data

Jul. 2, 1986 [JP] Japan .................... 61-155867

[51] Int. Cl.[4] .............................. H04M 1/65
[52] U.S. Cl. ....................... 379/67; 379/70; 379/79; 379/82
[58] Field of Search ............ 379/67, 70, 79, 82, 379/88

[56] References Cited

U.S. PATENT DOCUMENTS

| | | | |
|---|---|---|---|
| 3,728,488 | 4/1973 | Bonsky et al. | 379/82 |
| 4,547,630 | 10/1985 | Giamarrusco | 379/88 |
| 4,558,179 | 12/1985 | Bond | 379/70 |

Primary Examiner—James E. Tomassini
Attorney, Agent, or Firm—Lowe, Price, LeBlanc, Becker & Shur

[57] ABSTRACT

A telephone answering device using voice synthesizer as an outgoing message generating device, which playbacks outgoing message through built-in loudspeaker for confirmation in standby mode, even if occasional incoming call is received during confirmation of outgoing message, makes reset instantly then transmits outgoing message from its beginning to the calling party.

1 Claim, 2 Drawing Sheets

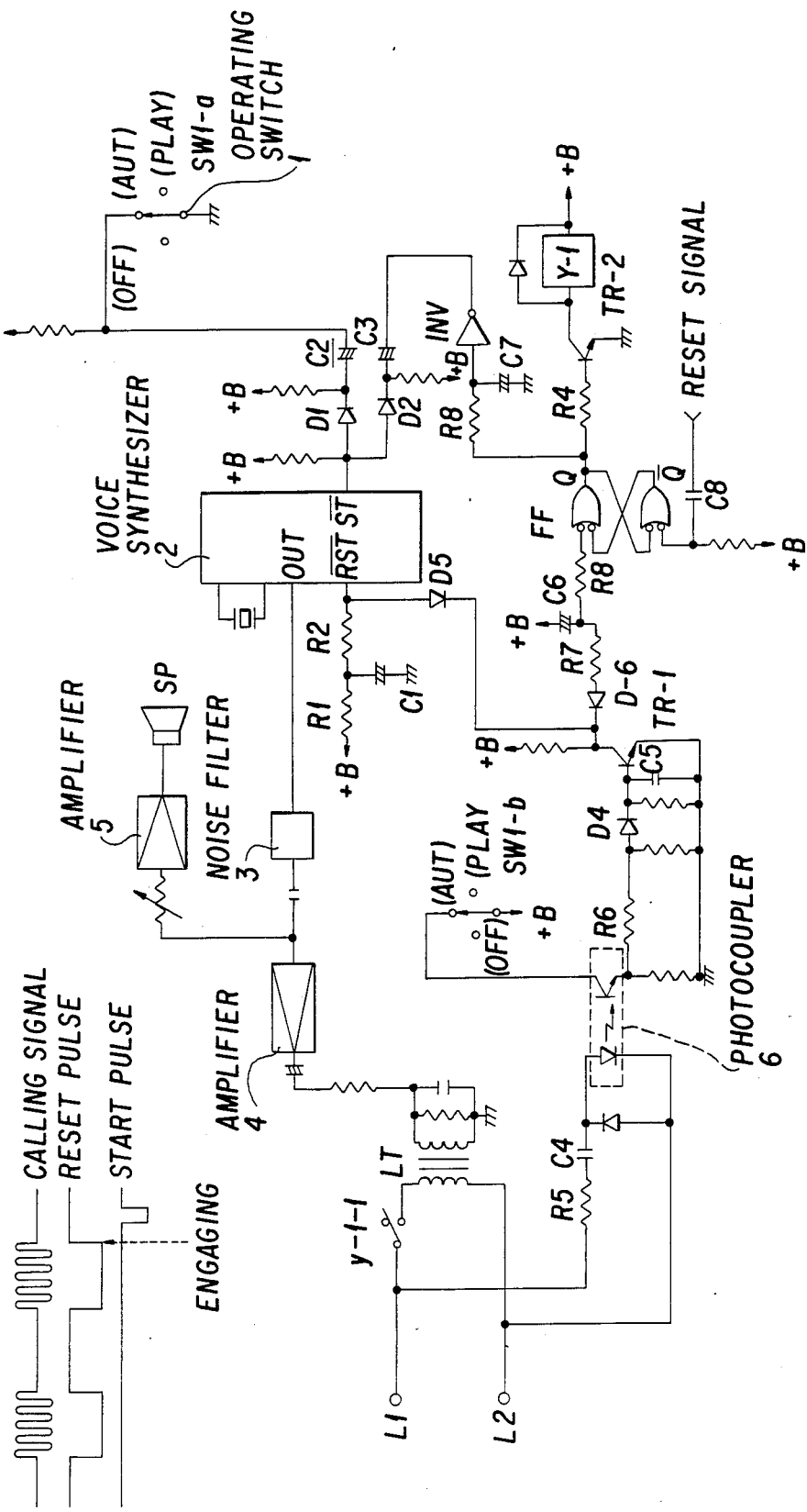

TELEPHONE ANSWERING DEVICE USING VOICE SYNTHESIZER FOR OUTGOING MESSAGE

BACKGROUND OF THE INVENTION

The present invention relates generally to a telephone answering device using a voice synthesizing means for generating an outgoing message, and more particularly to such a device that generates the outgoing message (from the beginning) upon receipt of an incoming call, even when the device is checking (or confirming) the outgoing message (OGM) in a "standby (auto answer) mode".

A conventional telephone answering device using voice synthesizing means for a conventional outgoing message, when set to an auto answer mode, produces said voice synthesized outgoing message through a built-in loudspeaker for checking the outgoing message, but if an incoming call happens to be received during said checking operation, sends the outgoing message beginning at the interrupted portion of the message after engaging (forming a loop circuit) upon receipt of an incoming call.

SUMMARY OF THE INVENTION

It is an object of the present invention to enable sending the voice synthesized outgoing message from its beginning to a calling party when the present device is engaged after a couple of ringing signals even if the incoming call is received during the checking operation of the outgoing message.

According to the operation of the present invention, when the ringing signal is detected or after it is detected, the moment the telephone line is engaged a voice synthesizer is automatically reset, and after a predetermined delay following engagement, a start pulse is supplied to the voice synthesizer to activate.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 1 is a circuit diagram which shows the first embodiment;

FIG. 2 is a timing chart of the reset pulse and the start pulse in the first embodiment;

DESCRIPTION OF THE PREFERRED EMBODIMENTS

Figure 3:
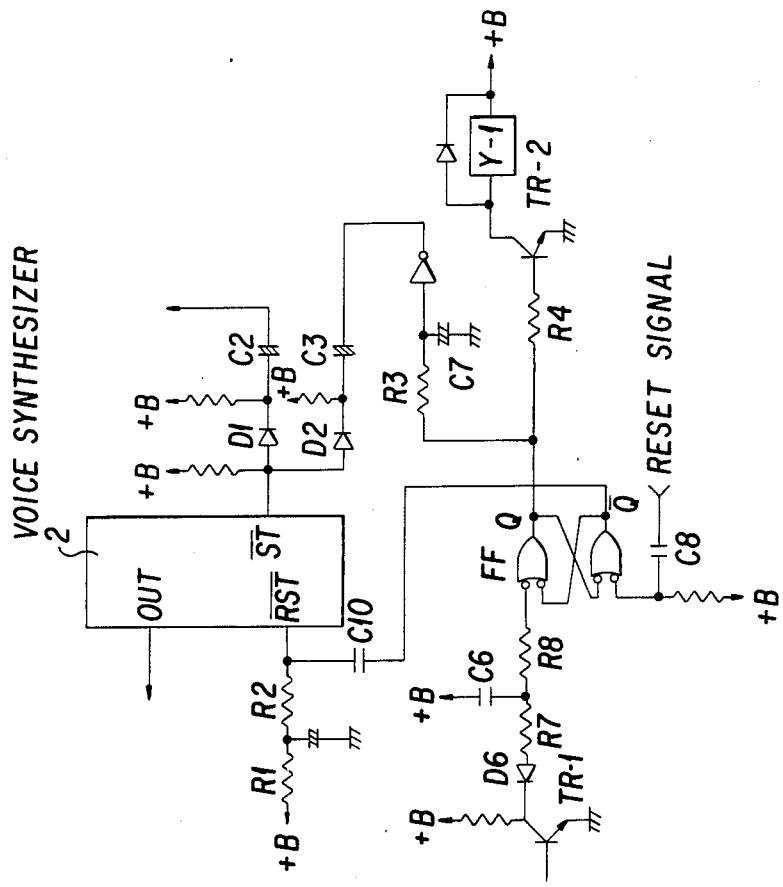
FIG. 3 is a circuit which shows the main part of the second embodiment.

The detailed arrangement and operation of the preferred embodiments according to the present invention will now be described.

Referring to FIG. 1, reference symbols L1 and L2 denote telephone lines. Reference symbol LT denotes a line transformer. Reference numeral 1 denotes an operation switch for switching the operation modes, wherein (AUTO) is a position for setting the present device to the auto answer/recording mode. A detailed description is omitted regarding other positions which have no direct relation with the present invention. Reference numeral 2 denotes a voice synthesizer, wherein reference symbol RST denotes a reset terminal which is reset on L level, ST denotes a start terminal which starts the voice synthesizer on L level and OUT denotes an output terminal of voice synthesizing. Reference numeral 3 denotes a noise filter for eliminating the noise produced from the voice synthesizer 2. Reference numerals 4 and 5 denote amplifiers. Reference symbol SP denotes a loudspeaker. Reference numeral 6 denotes a photocoupler for detecting a calling signal. Reference symbol FF denotes a flip-flop circuit for loop making, and Y-1 denotes a relay for loop making, which is controlled by the output of said FF and includes a contact y1-1.

Operation will be described with reference to the timing chart of FIG. 2.

First of all, the operation switch 1 is set to the (AUTO) position for auto answer/recording from the (OFF) position. Then the start terminal ST of the voice synthesizer 2 is turned into L level for an instant through a diode D1 by the changing current which flows when the right side of a condenser C2 is grounded through the operation switch 1. In response to this, the voice synthesizer 2 starts and produces the voice synthesized outgoing message (hereinafter referenced as OGM) from its beginning through the output terminal OUT. Said OGM is amplified by the loudspeaker SP through the noise filter 3 and the amplifier 5. If the calling signal has already arrived when said operation switch is set to the (AUTO) position as mentioned above, or if the calling signal arrives immediately after said switch is set to the (AUTO) position, it takes much time to engage the telephone line after the calling signal arrives, so the incoming call is to be received during the amplification of the voice synthesized OGM. Supposing that the telephone line is engaged in this condition, the OGM is not delivered to the calling party from its beginning. In accordance with this invention, it is arranged that when the calling signal arrives, the reset pulse is generated at the same time as the calling signal as shown in FIG. 2 and said reset pulse is supplied to the voice synthesizer 2 in FIG. 1. More particularly, the calling signal is detected by the photocoupler 6 and its output is smoothed by a diode D4 and a condenser C5. Thus, while the calling signal arrives, a transistor TR-1 is energized and the pulse of L level is supplied to the reset terminal RST of the voice synthesizer through a diode D5. Then, the operation of the voice synthesizer 2 is released. Meanwhile, when said transistor TR-1 is energized, a condenser C6 is gradually charged through a diode D6 and a resistor R7. When said condenser C6 reaches a predetermined voltage (L level) after, for example, two calling signals are supplied, the flip-flop circuit FF is set through a resistor R8. In response to the output of said FF, a transistor TR-2 is energized and the relay Y-1 is energized. Now, the telephone lines L1 and L2 are engaged through the contact y1-1 of the relay Y-1, so the calling signal stops. When the telephone lines are engaged by the set of said FF and the calling signal stops, as mentioned above, the reset signal mentioned above is no longer supplied to the voice synthesizer 2. At the same time, a condenser C7 starts to be charged from an output terminal Q of said FF, which becomes H level, through a resistor R3. After about 1 second elapses, the output of an inverter INV is turned into L level from H level. The start pulse of L level by a condenser C3 is applied to the start terminal ST of the voice synthesizer 2 and the voice synthesized OGM is output from its beginning through the output terminal OUT. Said output is delivered to the calling party through the noise filter 3, the amplifier 4 and the line transformer LT. When said OGM is completed, an incoming message tape (not shown) is to be driven to record an incoming message from the calling party. This operation has no direct relation with the present invention and is omitted in the figures. Further, it is arranged that the reset signal is supplied to the flip-flop FF to reset said FF after the recording of the incoming message from the calling party.

Figure 4:
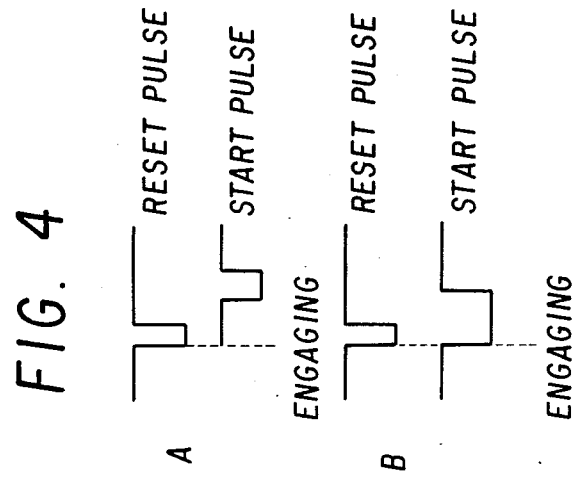
FIG. 4 is a timing chart of the reset pulse and the start pulse in the second embodiment.

Referring now to FIG. 3 of another embodiment, it is arranged that the reset pulse is supplied to the voice synthesizer 2 at the time of the engaging. More particularly, as mentioned above referring to FIG. 1, when the flip-flop FF is set in response to the calling signal, the output terminal Q of the FF is turned into L level from H level. Then, the reset pulse of L level is applied to the reset terminal RST of the voice synthesizer 2 by a condenser C10. Accordingly, if the voice synthesized OGM is being output, said output is released simultaneously with the engaging. In the same case, after about 1 second elapses, the condenser C7 is charged to the predetermined value by the output of said FF through the resistor R3, and then, as mentioned above referring to FIG. 1, the start pulse of L level by the condenser C3 is applied to the start terminal ST of the voice synthesizer 2, so the voice synthesized OGM can be sent from its beginning to the calling party. The timing of the reset pulse and the start pulse in this case is arranged as shown in FIG. 4-A. Further, it is possible to omit the time constant circuit when R3 X C7, if using the IC for voice synthesizing and its timing is the same as shown in FIG. 4-B. More particularly, even though the rising of the reset pulse occurs simultaneously with that of the start pulse, the width of the start pulse is wider than that of the reset pulse to make it possible to start the voice synthesizing.

In the present invention, when the telephone answering device is set to the auto answer/recording mode, even when the incoming call is received during the confirmation or checking of the voice synthesized OGM, said OGM can be sent to the calling party from its beginning without impressing the calling party unnaturally. Therefore, the present invention is very advantageous in using the telephone answering device for automatic answering when the synthesized outgoing message is being transmitted.

Although certain preferred embodiments have been shown and described, it should be understood that many changes and modifications may be made therein without departing from the scope of the invention.

What is claimed is:

1. A telephone answering device using a voice synthesizer as a means for generating an outgoing message, comprising
    (a) means for operating said voice synthesizer for confirmation without forming a loop circuit each time the telephone answering device is set to the standby mode;
    (b) means for resetting said voice synthesizer when an incoming call is received during said confirmation;
    (c) means for starting said voice synthesizer when it is reset; and
    (d) means for starting to send the outgoing message from its beginning to the calling party immediately after the telephone line is engaged in response to said incoming call.

* * * * *